United States Patent
Hwang et al.

(10) Patent No.: US 7,185,139 B2
(45) Date of Patent: Feb. 27, 2007

(54) EASY ACCESS PORT STRUCTURE AND ACCESS METHOD

(75) Inventors: Bar-Chung Hwang, Taoyuan (TW); Hsieh-Yi Lu, Yilan (TW)

(73) Assignee: Winbond Electronics Corporation, Hsinchu (TW)

(*) Notice: Subject to any disclaimer, the term of this patent is extended or adjusted under 35 U.S.C. 154(b) by 403 days.

(21) Appl. No.: 10/630,898

(22) Filed: Jul. 31, 2003

(65) Prior Publication Data

US 2005/0027925 A1    Feb. 3, 2005

(51) Int. Cl.
 *G06F 12/00* (2006.01)
(52) U.S. Cl. .......................................................... 711/5
(58) Field of Classification Search ................ 711/148, 711/149, 5, 105, 156; 710/317, 72; 365/189.04, 365/230.05
See application file for complete search history.

(56) References Cited

U.S. PATENT DOCUMENTS

| | | | | |
|---|---|---|---|---|
| 5,446,553 A | * | 8/1995 | Grube | 358/402 |
| 5,751,638 A | * | 5/1998 | Mick et al. | 365/189.04 |
| 6,058,066 A | * | 5/2000 | Norris et al. | 365/230.05 |
| 6,108,756 A | * | 8/2000 | Miller et al. | 711/148 |
| 6,115,763 A | * | 9/2000 | Douskey et al. | 710/72 |
| 6,154,824 A | * | 11/2000 | Robertson et al. | 711/5 |
| 6,763,418 B1 | * | 7/2004 | Chou et al. | 710/317 |

* cited by examiner

*Primary Examiner*—Pierre-Michel Bataille
(74) *Attorney, Agent, or Firm*—Sughrue Mion, PLLC (57) ABSTRACT

The present invention provides an easy access ports structure. In accordance with the present invention, each port has a register bank. Each register bank has the same address. A global register is used in the present invention to store the status values. When operating, the CPU accesses one port in accordance with the application program. The status values of the other ports are mapped to the global register. Therefore, the CPU also can understand the other ports status through the global register when accessing one port.

19 Claims, 8 Drawing Sheets

EASY ACCESS PORT STRUCTURE AND ACCESS METHOD

FIELD OF THE INVENTION

The present invention relates to an access structure, and more particularly to an access ports structure.

BACKGROUND OF THE INVENTION

Personal digital assistants, PDAs, have become necessities for businessman. A PDA can have functions such as managing personal data, managing a personal schedule, storing data, giving schedule reminders and so on. However, such management functions gradually are becoming insufficient, especially for those who require a larger memory space to store data or need to renew application programs often. Moreover, the increased complexity of the operation system and the application program also increase the need for a PDA with high storage capacity.

Typical PDA designs include an expansion port for receiving an expansion card to expand the storage capacity and to increase the renewable functions thereof. Such expansion card is a memory card for expanding the memory space or an application program card for providing additional application software. However, the single expansion port is not enough for a user. For example, if an application program card is inserted into the single port to provide additional software, an additional memory space cannot be provided by this PDA. Obviously, the single port design cannot satisfy all users. Therefore, a PDA with dual ports has been developed by engineers.

Developing the PDA with dual ports gives rise to other problems. For example, when two expansion cards are respectively inserted into the dual expansion ports, how to recognize the exact expansion port to access the exact data becomes a challenge. Typically, the problem can be solved by either using an additional address line to create an additional register to store the status of the two ports or dividing the register of the original signal port to respectively store the status of the two ports. However, both such methods require an additional address line, which causes the register address to be different from that of the single port design. Therefore, the typical PDA with dual ports requires a new driver design. On the other hand, the additional address line also increases the complexity of the circuit.

SUMMARY OF THE INVENTION

According to the above description, the typical PDA with dual ports requires an additional address line to create an additional address to store the status of the two ports, which requires a new driver design. On the other hand, the additional address line also increases the complexity of the circuit. Therefore, it is a main object of the present invention to provide a structure with a plurality of ports. A global register is used in this structure to switch the plurality of ports. Each port has the same address in the present invention. In other words, it is not necessary to change the driver, which increases the maintenance convenience.

Therefore, the present invention provides an easy access ports structure. In accordance with the present invention, each port has a register bank. Each register bank has the same address. A global register is used in the present invention to store the status. When operating, the CPU accesses one port in accordance with the application program. The status values of the other ports are mapped to the global register. Therefore, the CPU also can understand the other ports status through the global register when accessing one port. According to the present invention, each port has the same address. Therefore, it is not necessary to change the driver, which increases the maintenance convenience. On the other hand, the present invention does not use an additional address line. The additional address line is required only when the address space is not enough for the global register to use, which reduces the complexity of the circuit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Without limiting the spirit and scope of the present invention, the structure with a plurality of ports proposed in the present invention is illustrated with one preferred embodiment. One with ordinary skill in the art, upon acknowledging the embodiment, can apply the port structure of the present invention to various PDA apparatus. In accordance with the present invention, it is not necessary to use an additional address line to create an additional address to store the status of the other port. Therefore, the present invention does not require a new driver to drive it. On the other hand, it also can reduce the complexity of the circuit.

The address method of the structure in the present invention is same as the address method in the single port structure. Therefore, the driver design for the present invention is similar to the driver design for the single port structure, which is simple and increases the maintenance convenience. A dual ports structure used as an embodiment of the present invention is described in the following paragraphs. It is noted that the application of the present invention is not limited by the preferred embodiments described in the following. The present invention also can be used in a structure with a plurality of ports.

Figure 1:
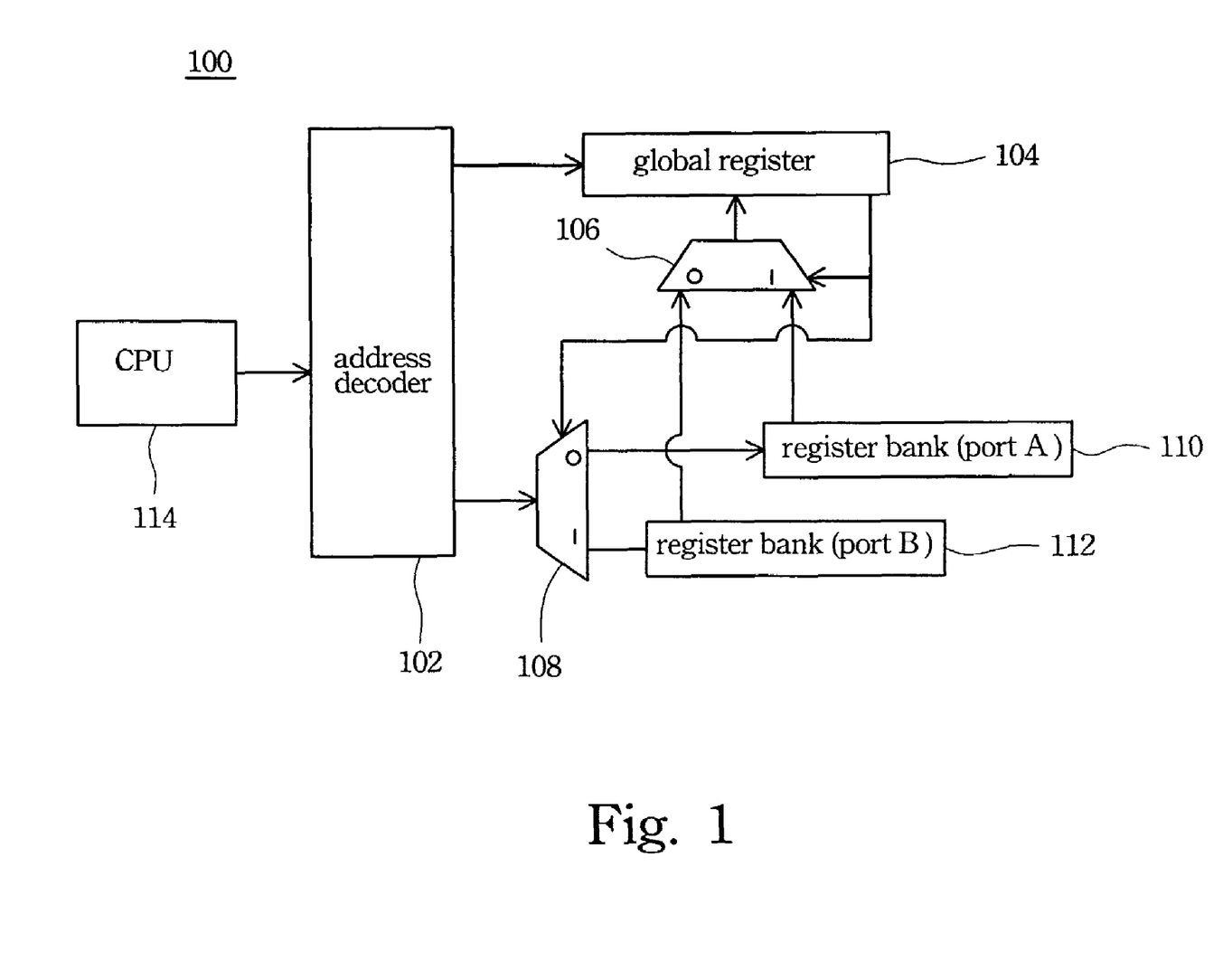
FIG. 1 illustrates a schematic diagram of a dual ports selective circuit in accordance with the present invention.

Referring to FIG. 1, a schematic diagram of a dual ports structure 100 is given in accordance with the present invention. Port A and port B comprise the dual ports structure. Each port has a register bank. Port A has register bank 110. Port B has register bank 112. Both register banks 110 and 112 have the same address. Register banks 110 and 112 are typically composed of a status register, a control register, a data in register, a data out register and an I/O control register. A global register 104 is also used in the present invention to store a control value and the mapped status value from the port A or the port B.

When performing the access process, the CPU 114 can access the port A or the port B in accordance with the control value stored in the global register 104. The other port that is not accessed by the CPU 114 maps its status value to the global register 104. Therefore, the CPU 114 can determine the port status through the global register 104.

A multiplexer 106 and a selector are also used in the present invention. The selector 108 is used to select an access register bank for the CPU 114. The multiplexer 106 is used to select a register bank for mapping to the global register 104. An address decoder 102 is used to decode the address signal. Then, the CPU 114 can control the selector 108 to access a port according to the control value stored in the global register 104 after decoding the address signal. On the other hand, the other port that is not accessed by the CPU 114 can map its status value to the global register 104 through the multiplexer 106. However, it is noted that the status values of the port A and the port B can be mapped to the global register 104 together if the global register 104 has the enough storage space. Such structure does not use the multiplexer 106.

For example, if the port A is the port that the CPU 114 wants to access, the control value stored in the global register 104 is "0". At this time, the CPU 114 can control the selector 108 to select the register bank 110, port A, as the access port through the address decoder 102. On the other hand, the status value of the register bank 112 can be mapped to the global register 104 through the multiplexer 106. Therefore, the CPU 114 not only selects the port A as an access port but also recognize the status of the port B through the address decoder 102.

Similarly, if the port B is the port that the CPU 114 wants to access, the control value stored in the global register 104 is "1". At this time, the CPU 114 can control the selector 108 to select the register bank 112, port B, as the access port. On the other hand, the status value of the register bank 110 can be mapped to the global register 104 through the multiplexer 106. Therefore, the CPU 114 not only selects the port B as the access port but also recognizes the status of the port A through the address decoder 102. It is noted that the user can set the Boolean value. The status values of the port A and the port B can be mapped to the global register 104 together if the global register 104 has the enough storage space. Therefore, the multiplexer 106 can be removed.

Figure 2:
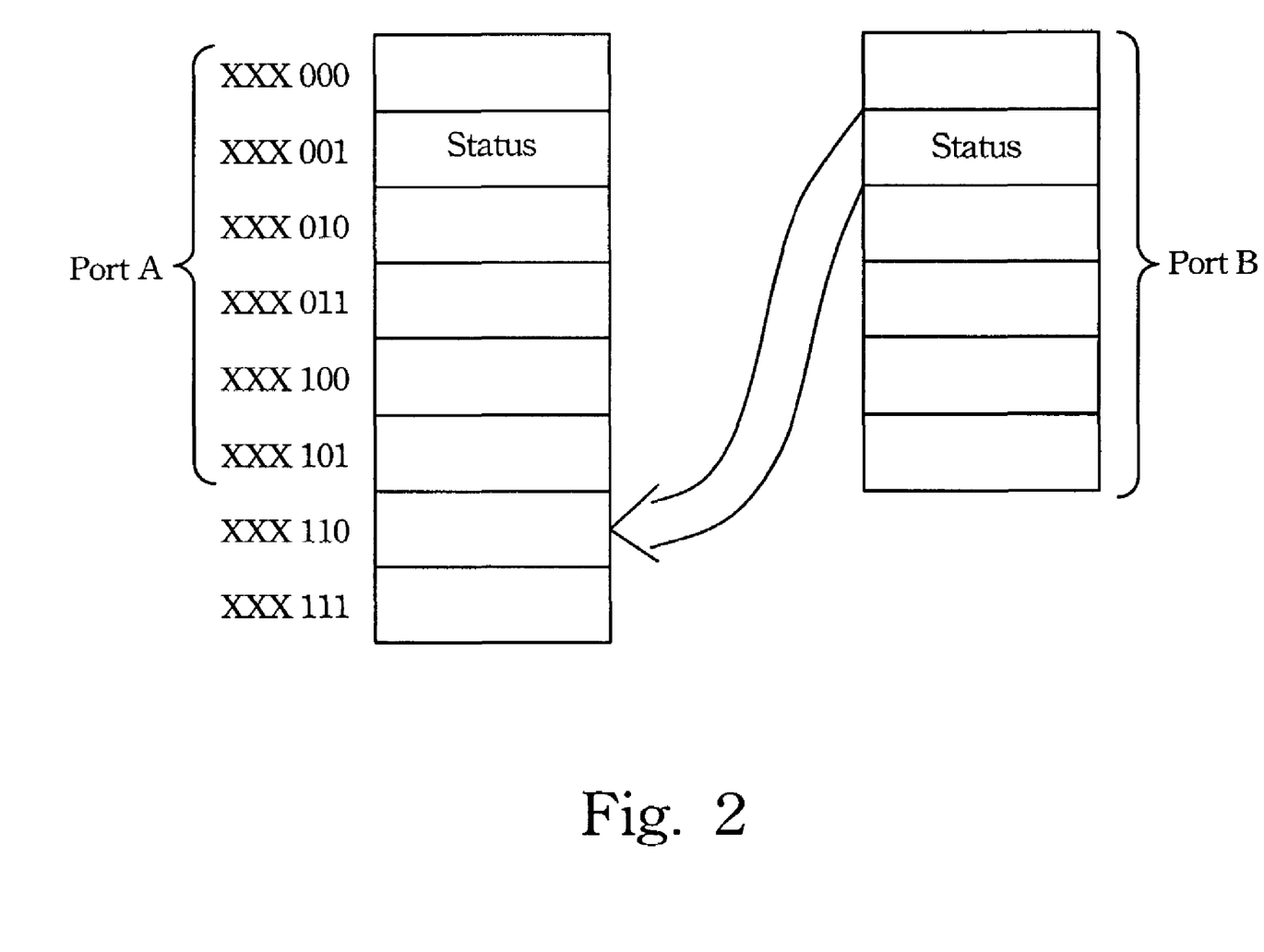
FIG. 2 illustrates a schematic diagram of a register bank in accordance with the dual ports structure of the present invention.

Referring to FIG. 2, a schematic diagram of a register bank is given in accordance with the dual ports structure of the present invention. The two register banks have the same address. If these values, such as the status value, the control value and so on, of port A are arranged in the address from XXX000 to XXX101, the address from XXX110 to XXX111 can be arranged to the global register. This global register is used to store a control value and a status value that is mapped from the port A or the port B. The port B maps the status value to the address XXX110 when the select signal stored in the address XXX111 of the global register indicates the port A is the access port. Therefore, the CPU 114 not only accesses port A but also recognizes the port B status.

Contrarily, the port A maps the status value to the address XXX110 when the select signal stored in the address XXX111 of the global register indicates that port B is the access port. Therefore, the CPU 114 not only accesses the port B but also recognizes the port A status.

Figure 3:
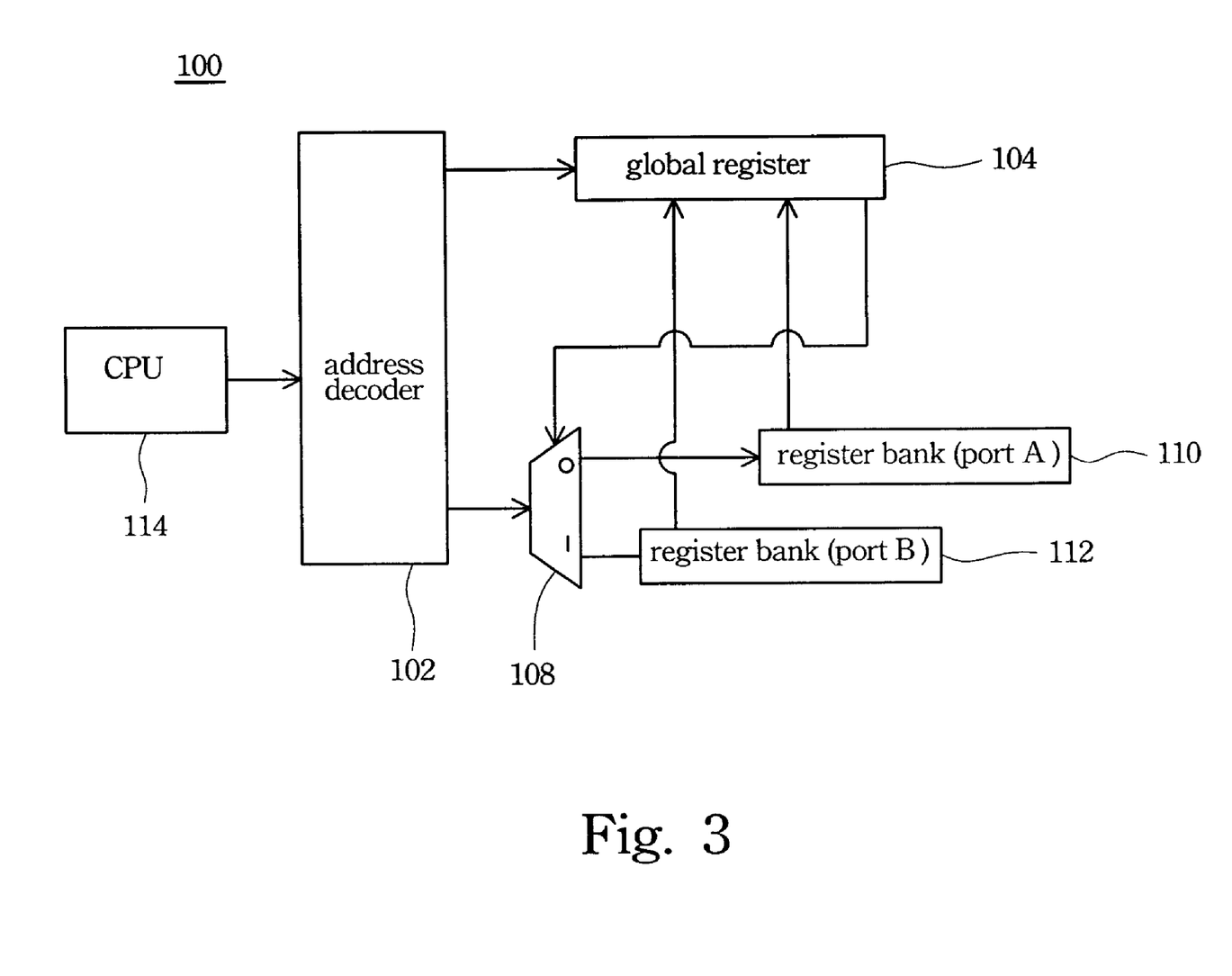
FIG. 3 illustrates the dual ports structure without the multiplexer.

On the other hand, if the global register 104 has enough address for port A and port B to map their status values in the dual ports structure 100 of the present invention, the multiplexer 106 can be removed. FIG. 3 illustrates the dual ports structure without the multiplexer. When accessing this dual ports structure as shown in the FIG. 3, the CPU 114 can access port A or port B according to the control value stored in the global register 104. On the other hand, both the status values of the port A and port B can be mapped to the global register 104. Therefore, the CPU 114 can recognizes the port A and port B status through the global register 104.

Figure 4:
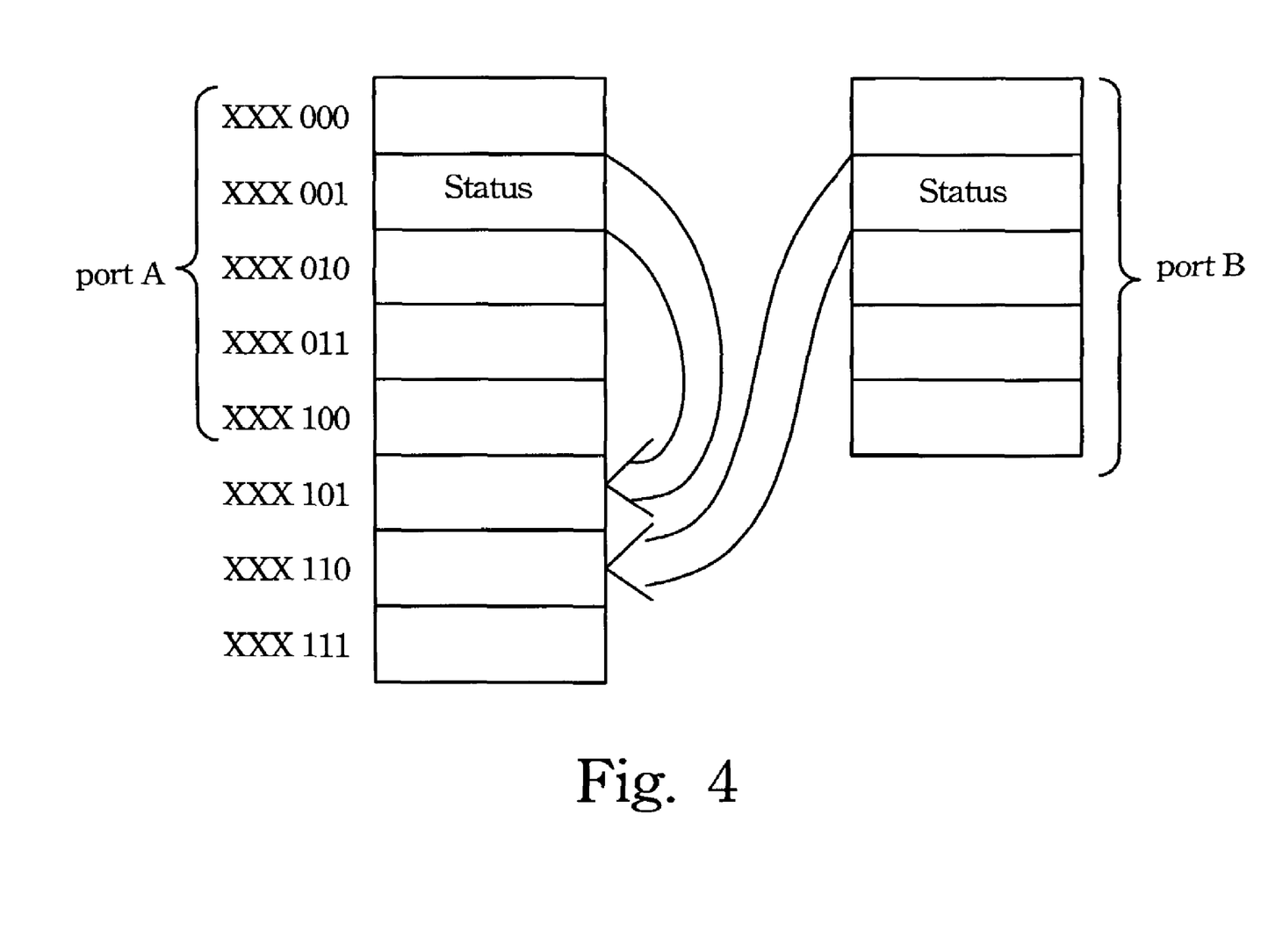
FIG. 4 illustrates a schematic diagram of a register banks in accordance with the structure described in the FIG. 3 of the present invention.

Referring to FIG. 4, it illustrates a schematic diagram of a register bank is given in accordance with the dual ports structure of the FIG. 3 of the present invention. The two register banks have the same address. If these values, such as the status value, the control value and so on, of port A are arranged in the address from XXX000 to XXX100, the address from XXX110 to XXX111 can be arranged to the global register. This global register is used to store a control values and two status values that are mapped from the port A and the port B. For example, the port A and the port B map their status values to the address XXX101 and the address XXX110 when the select signal indicates the port A is the access port. Therefore, the CPU 114 not only accesses port A but also recognizes the port A and port B status through the global register.

Contrarily, the port A and the port B map their status values to the address XXX101 and the address XXX110 when the select signal indicates that port B is the access port. Therefore, the CPU 114 not only accesses the port B but also recognizes the port A and the port B status through the global register.

Although a dual ports structure is used to describe the above embodiment, the present invention also can be used in a structure with a plurality of ports. Similarly, such structure with a plurality of also uses a global register to select an access port. The other ports can map their status to the global register. Therefore, the CPU not only selects the access port but also recognizes the status of the other ports through the global register.

Figure 5:
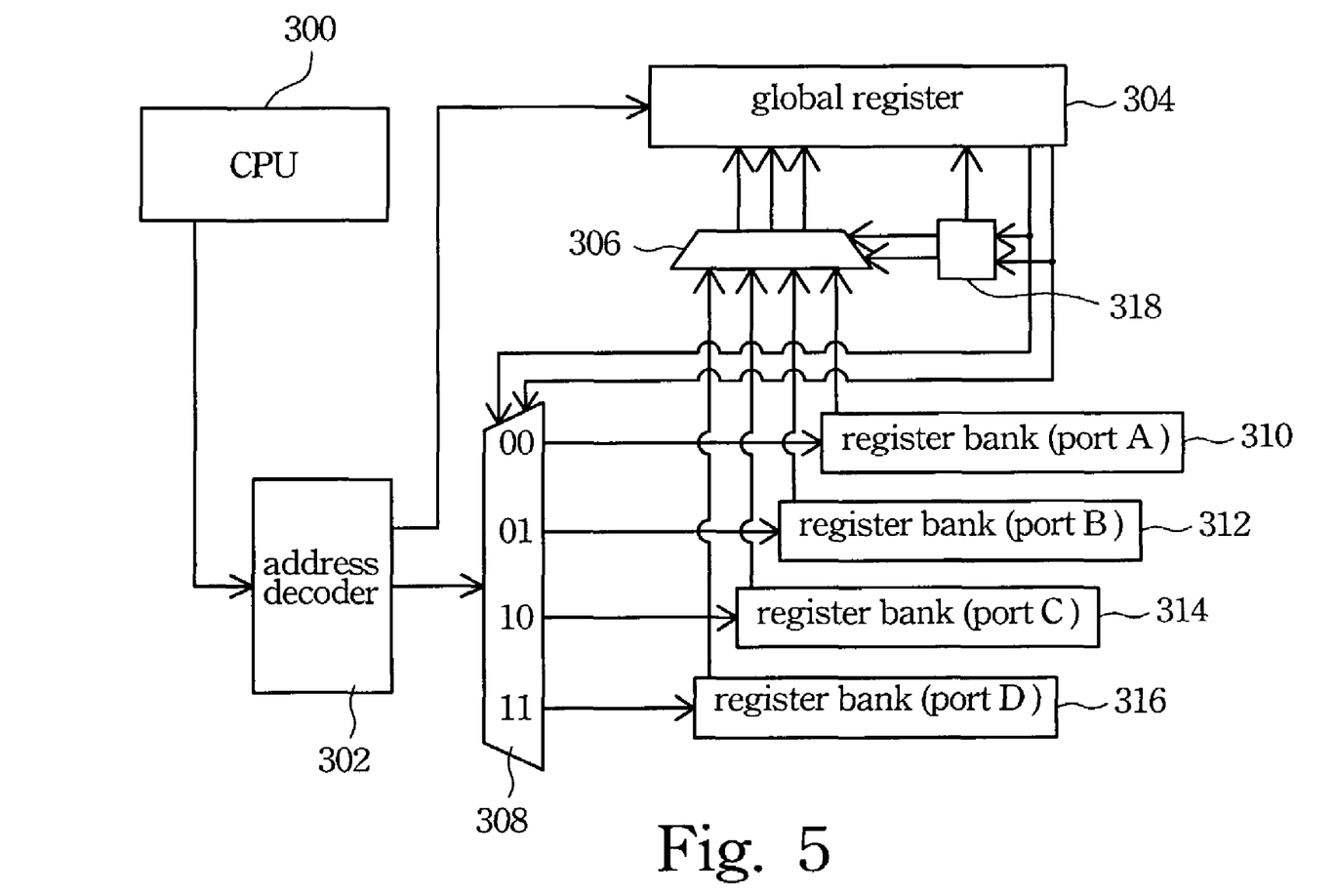
FIG. 5 illustrates a schematic diagram of a selective circuit with a plurality of ports in accordance with the present invention.

Referring to FIG. 5, a schematic diagram of a selective circuit with a plurality of ports is given in accordance with the present invention. This structure with a plurality of ports according to the embodiment is composed of Port A, port B, port C and port D. Each port has a register bank. Port A has the register bank 310. Port B has the register bank 312. Port C has the register bank 314. Port D has the register bank 316. The four register banks 310, 312, 314 and 316 have the same address. A global register 304 is also used in the embodiment to store a control value and the mapped status value from the port A, port B, port C or port D. The control value is used to tell the CPU which is the access port.

When performing the access process, the CPU 300 can access the port A, port B, port C or port D in accordance with the control value stored in the global register 304. The other ports that are not accessed by the CPU 300 map their status value to the global register 304. Therefore, the CPU 300 can determine the status of all ports through the global register 304 during the access process.

Similarly, a multiplexer 306 controlled by an IC circuit 318 is used to select the register banks for mapping to the global register 304. An address decoder 302 is used to decode the address signal. Then, the CPU 300 can control the selector 308 to access a port according to the control value stored in the global register 304 after decoding the address signal. At this time, the other three ports that are not accessed by the CPU 300 can map their status values to the global register 304 through the multiplexer 306. It is noted that the status values of the port A, port B, port C and port D can be mapped to the global register 304 together if the global register 304 has the enough storage space. Such a structure does not use the multiplexer 306.

Figure 6:
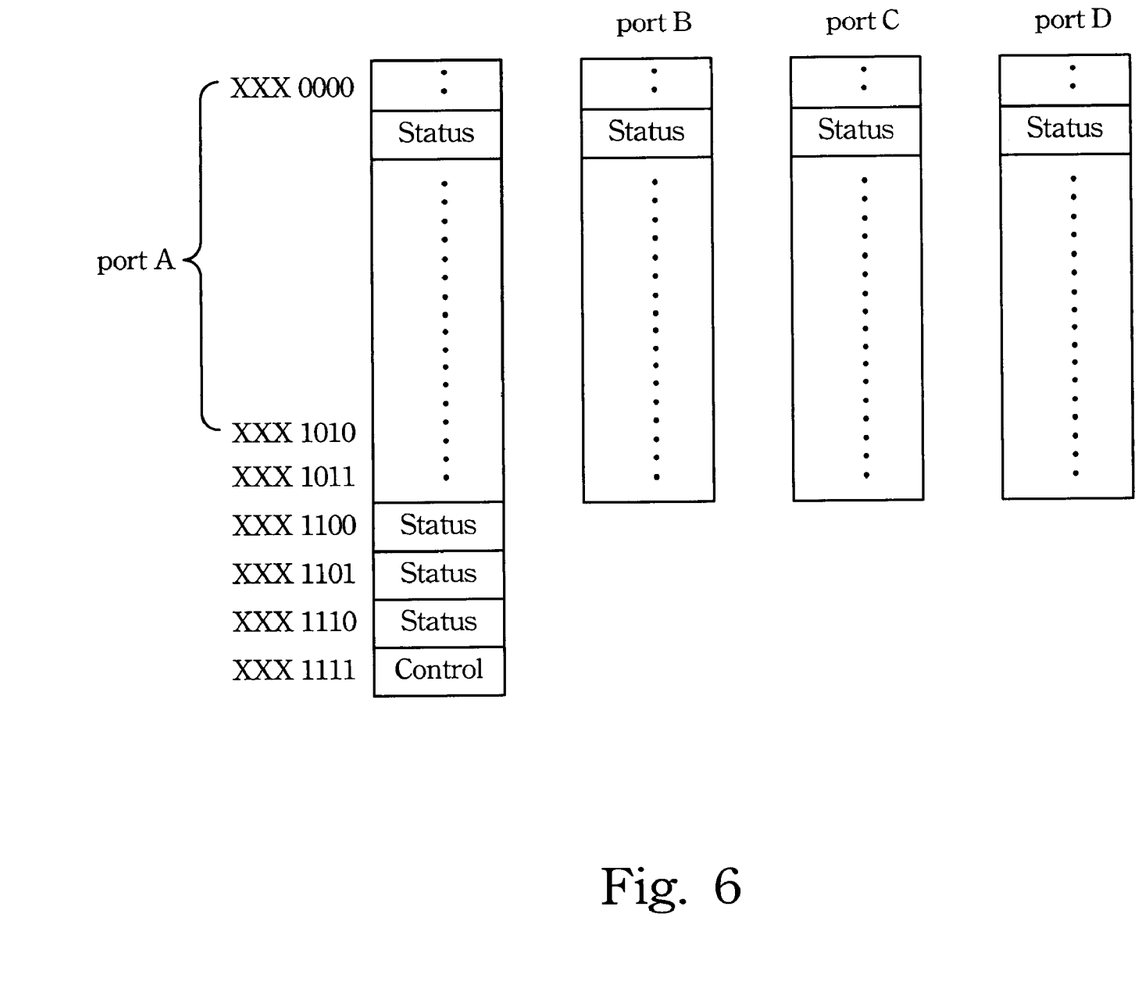
FIG. 6 illustrates a schematic diagram of the register banks in accordance with the structure with a plurality of ports in the present invention.

Referring to FIG. 6, a schematic diagram of the register banks is given in accordance with the structure with four ports, port A, port B, port C and port D. The four register banks have the same address. If these values, such as the status value, the control value and so on, of port A are arranged in the address from XXX0000 to XXX1011, the address from XXX1100 to XXX1111 can be arranged to the global register. This global register is used to store a control value and a plurality of status values that are mapped from port A, port B, port C or port D.

The status values of the other three ports, port B, port C and port D, are mapped to the address from XXX1100 to XXX1110 when the control value stored in the address XXX1111 of the global register indicates that the CPU should access the port A. On the other hand, indication data are stored in the address XXX1111. These data are used to tell the CPU which status values arranged in the address from XXX1100 to XXX1110 respectively belong to which port. Therefore, the CPU can determine all ports status through the global register. The data arrangement in the global register is not limited by the above description.

Figure 7:
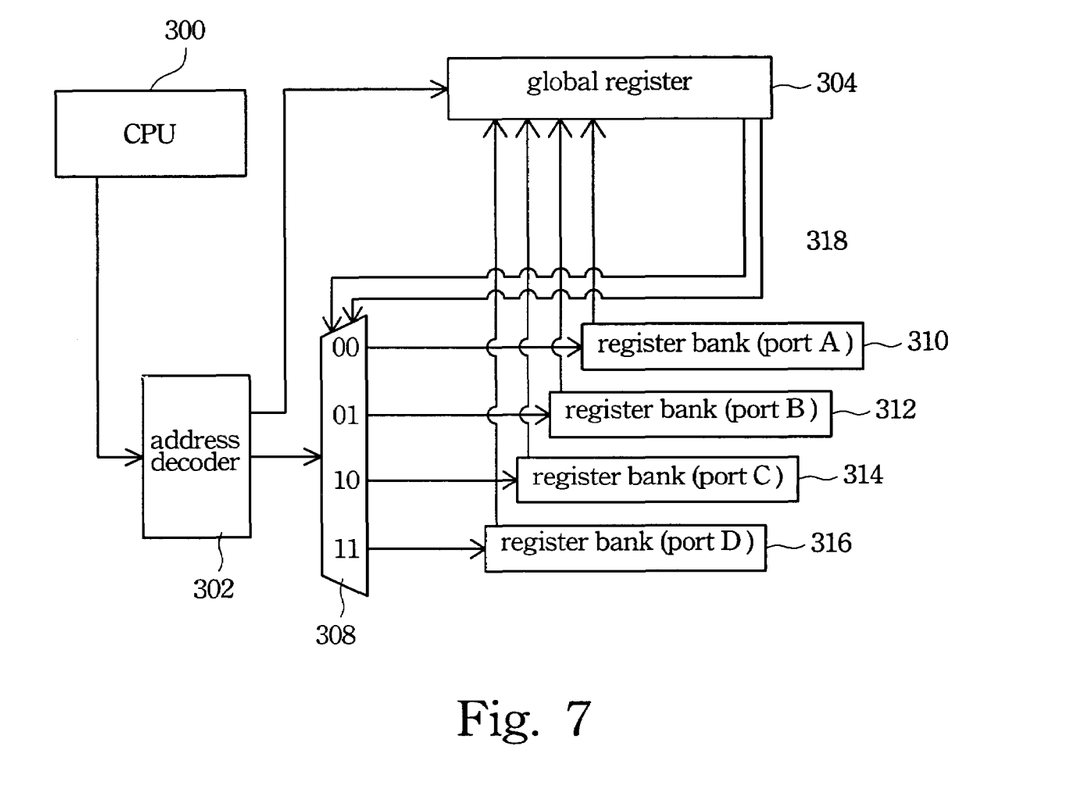
FIG. 7 illustrates the ports structure without the multiplexer and the IC circuit.

For example, if the global register 304 has enough address for port A, port B, port C and port D to map their status values, the multiplexer 306 and the control circuit 318 can be removed. FIG. 7 illustrates the ports structure without the multiplexer 306 and the control circuit 318. When accessing this ports structure as shown in the FIG. 7, the CPU 300 can access one of the port A, port B, port C or port D according to the control value stored in the global register 304. On the other hand, all of the status values of the port A, port B, port C and port D can be mapped to the global register 304. Therefore, the CPU 114 can recognizes the status of the all ports through the global register 104.

Figure 8:
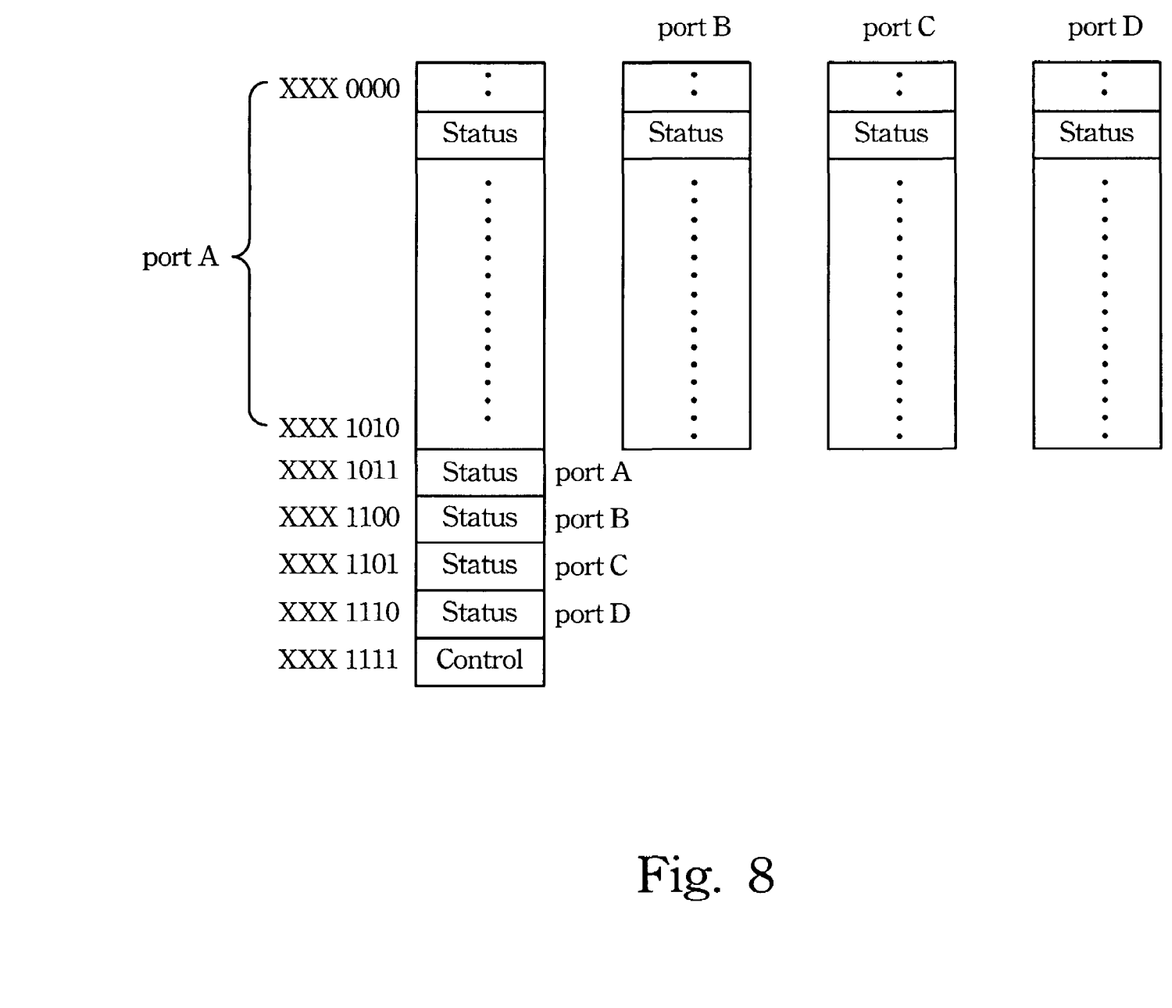
FIG. 8 illustrates a schematic diagram of a register banks in accordance with the structure described in the FIG. 7 of the present invention.

Referring to FIG. 8, it illustrates a schematic diagram of a register bank is given in accordance with the ports structure of the FIG. 7 of the present invention. The four register banks have the same address. If these values, such as the status value, the control value and so on, of port A are arranged in the address from XXX000 to XXX1010, the address from XXX1011 to XXX1111 can be arranged to the global register. This global register is used to store a control values and four status values that are mapped from the port A, port B, port C and the port D. For example, the port A, port B, port C and the port D respectively map their status values to the address XXX1011 to the address XXX1110 when the select signal indicates the port A is the access port. Therefore, the CPU not only accesses port A but also recognizes the port A, port B, port C and the port D status through the global register.

A global register is used in this present invention structure to switch the plurality of ports. Each port has the same address. In other words, it is not necessary to change the driver, which increases the maintenance convenience. On the other hand, the present invention does not use an additional address line, which reduces the complexity of the circuit.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An easy access dual ports structure, wherein said structure has a first port and a second port, and a CPU uses said dual ports structure to access said first port or said second port, said easy access dual ports structure comprising:
 a first register bank for storing values of said first port, wherein said values comprise a first status value;
 a second register bank for storing values of said second port, wherein said values comprise a status value;
 a global register for storing a control value and at least one status value of said two status values stored in said first register bank and said second register bank respectively;
 an address decoder coupling with said CPU to decode an address signal; and
 a selector for selecting one of said first register bank and said second register bank to couple with said address decoder and mapping the status value of another register bank to said global register according to said control value stored in said global register, wherein said CPU can access said first register bank or said second register bank through said address decoder.

2. The easy access dual ports structure according to claim 1, wherein said first register bank and said second register bank have a same address.

3. The easy access dual ports structure according to claim 1, wherein said status value of said second register bank is mapped to said global register when said first register bank is coupled with said address decoder.

4. The easy access dual ports structure according to claim 1, wherein said status value of said first register bank is mapped to said global register when said second register bank is coupled with said address decoder.

5. An easy access ports structure, wherein said structure has a plurality of ports, including a first to an $N^{th}$ port, and a CPU uses said structure to access a port, said easy access ports structure comprising:
 a plurality of register banks, including a first to an $N^{th}$ register bank, for respectively storing values of said plurality of ports, wherein said values of each port comprise a status value;
 a global register for storing a control value and at least (N-1) status values;
 an address decoder coupling with said CPU to decode an address signal; and
 a selector for selecting one of said register banks to couple with said address decoder and mapping the status values of other banks to said global register according to said control value stored in said global register, wherein said CPU accesses said corresponding register bank through said address decoder.

6. The easy access dual ports structure according to claim 5, wherein said values of each port comprise a status value.

7. The easy access dual ports structure according to claim 5, wherein said plurality of register banks have a same address.

8. A method for accessing a dual ports structure, said dual ports structure comprising two register banks, a first and a second register bank, for respectively at least storing the status values of said two ports, a global register for at least storing a control value, and a CPU for using said dual ports structure to access one port of said two ports, wherein said method comprises:
- coupling said first register bank to said CPU according to said control value for said CPU to access said first register bank; and
- coupling said second register bank to said global register according to said control value for mapping said status value of said second register bank to said global register.

9. The method according to claim 8, wherein said mapping means to map the status value to said global register.

10. The method according to claim 8, wherein said first register bank and said second register bank have a same address.

11. A method for accessing a dual ports structure, said dual ports structure comprising two register banks, a first and a second register bank, for respectively at least storing the status values of said two ports, a global register for at least storing a control value, and a CPU for using said dual ports structure to access one port of said two ports, wherein said method comprises:
- coupling said first register bank to said CPU according to said control value for said CPU to access said first register bank; and
- mapping said status values of said two register banks to said global register.

12. The method according to claim 11, wherein said mapping means to map the status value to said global register.

13. The method according to claim 11, wherein said first register bank and said second register bank have a same address.

14. A method for accessing a ports structure, said ports structure comprising a plurality of register banks, including a first to an $N^{th}$ register bank, for respectively at least storing the status values of said a plurality of ports, a global register for at least storing a control value, and a CPU for using said ports structure to access one port of said a plurality of ports, wherein said method comprises:
- coupling said first register bank to said CPU according to said control value for said CPU to access said first register bank; and
- coupling said second to $N^{th}$ register bank to said global register according to said control value for mapping said status values of said second to $N^{th}$ register bank to said global register.

15. The method according to claim 14, wherein said mapping means to map the status value to said global register.

16. The method according to claim 14, wherein said first to $N^{th}$ register bank have a same address.

17. A method for accessing a ports structure, said ports structure comprising a plurality of register banks, including a first to an $N^{th}$ register bank, for respectively at least storing the status values of said a plurality of ports, a global register for at least storing a control value, and a CPU for using said ports structure to access one port of said a plurality of ports, wherein said method comprises:
- coupling said first register bank to said CPU according to said control value for said CPU to access said first register ban; and
- mapping said status values of said first to $N^{th}$ register bank to said global register.

18. The method according to claim 17, wherein said mapping means to map the status value to said global register.

19. The method according to claim 17, wherein said first to $N^{th}$ register bank have a same address.

* * * * *